United States Patent [19]

Chau et al.

[11] Patent Number: 5,108,763

[45] Date of Patent: Apr. 28, 1992

[54] MICROENCAPSULATED HIGH INTENSITY SWEETENING AGENTS HAVING PROLONGED SWEETNESS RELEASE AND METHODS FOR PREPARING SAME

[75] Inventors: Tommy L. Chau, Bridgewater; Subraman R. Cherukuri, Towaco; Elnoria Tolliver, Morristown, all of N.J.

[73] Assignee: Warner-Lambert Company, Morris Plains, N.J.

[21] Appl. No.: 679,865

[22] Filed: Apr. 3, 1991

[51] Int. Cl.$^5$ .............................................. A23G 3/30
[52] U.S. Cl. ......................................... 426/5; 426/96; 426/99; 426/548; 426/804
[58] Field of Search ................................... 426/3–5, 426/96, 99, 548, 804

[56] References Cited

U.S. PATENT DOCUMENTS

| | | | |
|---|---|---|---|
| 4,816,265 | 3/1989 | Cheruhuri et al. | 426/5 |
| 4,839,184 | 6/1989 | Cherukuri | 426/5 |
| 4,863,745 | 9/1989 | Zibell | 426/5 |
| 4,981,698 | 1/1991 | Cheruhuri et al. | 426/5 |
| 4,992,280 | 2/1991 | Yung et al. | 426/5 |
| 5,000,965 | 3/1991 | Killeen et al. | 426/5 |

*Primary Examiner*—Jeanette Hunter

[57] ABSTRACT

The present invention is a directed at a sweetening agent delivery system having prolonged sweetness release prepared by a method which comprises the steps of (A) providing the following ingredients in percentages by weight of the sweetening agent delivery system (a) a solution of a high intensity sweetening agent, wherein the sweetening agent is present in an amount from about 0.01% to about 60%, (b) polyvinyl acetate present in an amount from about 40% to about 93% and having a molecular weight in the range from about 2,000 to about 100,000, (c) a plasticizing agent present in an amount from about 0.1% to about 20%, (d) a waxy material having a melting point from about 30° C. to about 120° C. present in an amount from about 0.5% to about 40%, and (e) an emulsifying agent present in an amount from about 0.1% to about 20%, (B) melting and blending the polyvinyl acetate with the plasticizing agent to form a uniform mixture, (C) admixing the solution of high intensity sweetening agent with the melted mixture from step (B) and evaporating the solvent to form a uniform mixture, (D) admixing the waxy material and the emulsifying agent with the mixture from step (C) to form a uniform mixture, (E) cooling and blending the mixture from step (D), and (F) granulating the mixture from step (E).

20 Claims, 1 Drawing Sheet

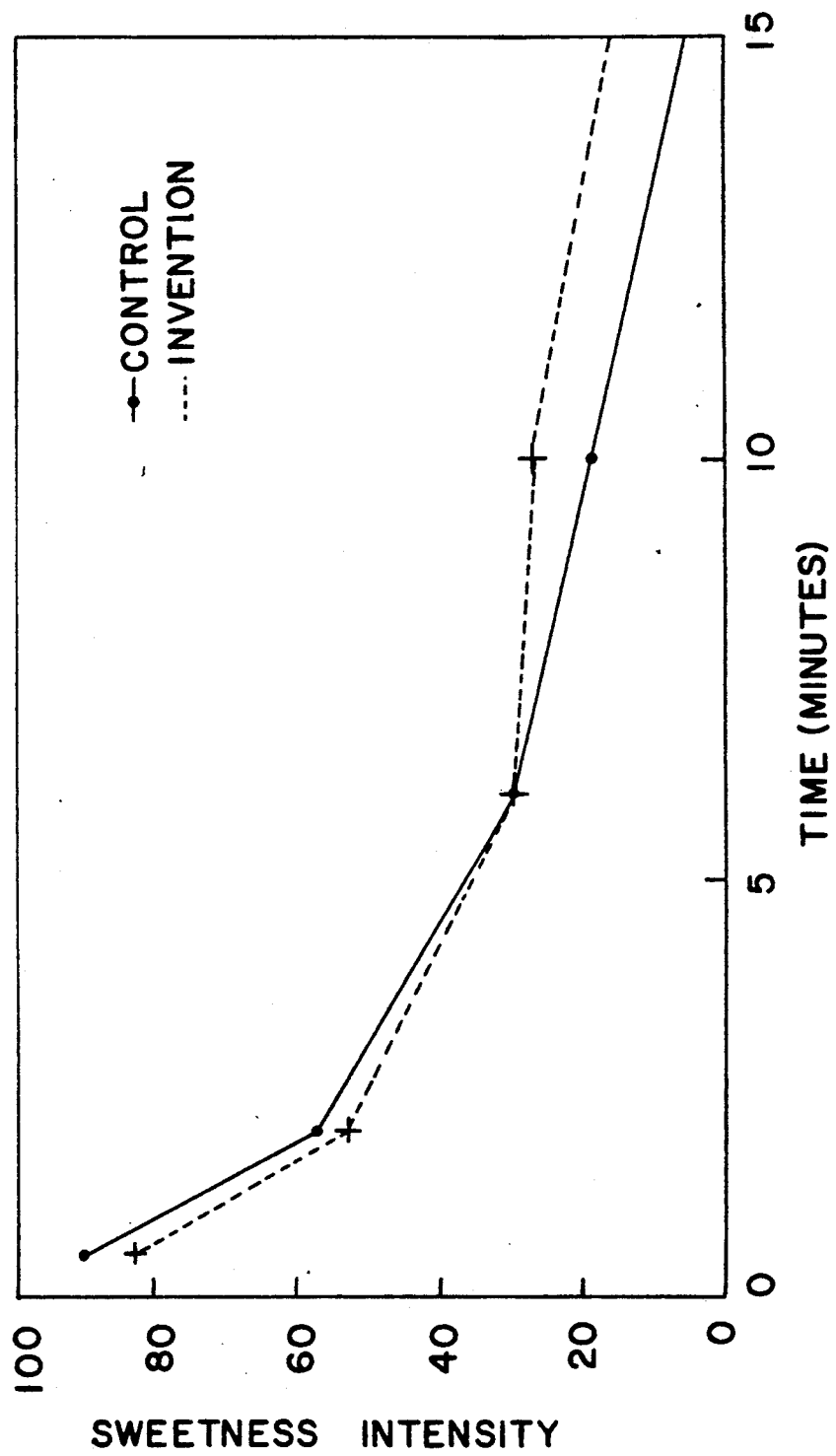

MICROENCAPSULATED HIGH INTENSITY SWEETENING AGENTS HAVING PROLONGED SWEETNESS RELEASE AND METHODS FOR PREPARING SAME

BACKGROUND OF THE INVENTION

1. Field of the Invention

This invention pertains to improved sweetening agent delivery systems comprising a high intensity sweetening agent protected by a coating of polyvinyl acetate and having prolonged sweetness release. The sweetening agent delivery system is prepared by adding a solution of a high intensity sweetening agent to a melted mixture of polyvinyl acetate and a plasticizing agent and evaporating the solvent. A waxy material and an emulsifying agent are blended into the mixture which is then cooled and granulated to a desired particle size. The sweetening agent delivery systems may be used in a wide variety of ingestible products such as chewing gum compositions, hard and soft confections, and beverages.

2. Description of the Prior Art

High intensity sweetening agents are natural or synthetic compounds which have a sweetening intensity greater than sugar (sucrose) and a caloric value lower than sugar at equivalent sweetness levels. High intensity sweetening agents are well known in the art and are widely substituted for sugar in many low calorie and noncariogenic ingestible compositions.

Examples of high intensity sweetening agents are water-soluble natural sweetening agents such as dihydrochalcones, monellin, Stevia Rebaudiana (steviosides), and glycyrrhizin; water-soluble artificial sweetening agents such as 1,2-benzisothiazol-3(2H)-one 1,1-dioxide (saccharin and its salts, a commercially available product from PMC Specialty Group Inc., Cincinnati, Ohio), cyclohexylsulfamic acid (cyclamate and its salts), and the potassium salt of 6-methyl-1,2,3-oxathiazin-4(3H)-one-2,2-dioxide (Acesulfame-K, a commercially available product from Hoechst Celanese Corporation, Somerville, N.J.); proteins such as thaumatin (Talin, a commercially available product of Tate & Lyle Products, Reading, United Kingdom); chlorodeoxysugar derivatives (such as Sucralose, a commercially available product of McNeil Specialty Products Company, Skillman, N.J.); and dipeptides such as N-L-alpha-aspartyl-L-phenylalanine 1-methyl ester (Aspartame, a commercially available product of the Nutrasweet Company, Deerfield, Ill.) and L-alpha-aspartyl-D-alanine N-(2,2,4,4-tetramethyl-3-thietanyl)amide (Alitame, a commercially available product of Pfizer, New York, N.Y.). Each of these sweetening agents has a distinct sweetening intensity greater than that of sucrose and this sweetening intensity is well documented. For example, the following sweetening agents have the sweetness intensities set out below.

| Sweetness Intensities of Various High Intensity Sweetening Agents | |
|---|---|
| COMPOUND | SWEETNESS INTENSITY* |
| 1, 2-Benzisothiazol-3(2H)-one 1, 1-dioxide (Saccharin and its salts) | 300× |
| Cyclohexylsulfamic acid (Cyclamate and its salts) | 30× |
| N-L-alpha-Aspartyl-L-phenylalanine 1-methyl ester (Aspartame) | 180×–200× |
| Potassium salt of 6-methyl-1,2,3-oxathiazin-4(3H)-one-2,2-dioxide (Acesulfame-K) | 160× 200× |
| 4,1',6'-Trichloro-4,1',6'-trideoxy-galactosucrose (Sucralose) | 600× |
| L-alpha-Aspartyl-N-(2,2,4,4-tetramethyl-3-thietanyl)-D-alaninamide hydrate (Alitame) | 2000X |
| Dihydrochalcones | 1500× |
| Monellin | 1500×–3000× |
| Steviosides | 250×–300× |
| Glycyrrhizin | 50×–100× |

*Compared to sucrose.

Because each high intensity sweetening agent is chemically and physically distinct, each sweetening agent is a challenge to use in an ingestible composition. For example, many high intensity sweetening agents lose their sweetness intensity quickly when used in ingestible products such as chewing gums and confections. Saccharin, stevioside, Acesulfame-K, glycyrrhizin, and thaumatin have an associated bitter taste or off-note. Certain intense sweeteners are unstable or sensitive to moisture, temperature, and pH value. For example, Aspartame is unstable in the presence of aldehydes, ketones, and moisture. Solid Sucralose turns dark during prolonged storage or at elevated temperatures.

To prolong sweetness release and stabilize sensitive sweetening agents, many sweetening agents are encapsulated within a coating layer. Although encapsulation can prolong sweetness release and stabilize sensitive sweetening agents to an extent, these methods are not always satisfactory. For example, Aspartame is particularly difficult to encapsulate using conventional mixing and spray coating techniques because Aspartame crystals are rod-like, needle-like, and dendritic in shape and are particularly difficult to wet. Attempts to coat Aspartame crystals with mixtures of fat and lecithin using conventional mixing and spray techniques result in poor wetting and spotty coating of the core material.

U.S. Pat. No. 4,435,440, issued to Hough et al. and assigned to Tate and Lyle plc, discloses sweetening agents which comprise chlorodeoxysugar derivatives.

U.S. Pat. No. 4,343,934, issued to Jenner et al. and assigned to Tate & Lyle plc, discloses crystalline sucralose for use in food stuffs, beverages, and confections.

U.S. Pat. No. 4,927,646, issued to Jenner et al. and assigned to Tate & Lyle plc, discloses a codried or spray dried composition consisting of about 20% to about 80% Sucralose and a water-soluble oligosaccharide, by dry weight.

PCT patent application Ser. No. WO 89/08672A, priority date May 15, 1987, to Wm. Wrigley Jr. Company, discloses a chewing gum composition having controlled sweetness wherein the gum contains an effective amount of Sucralose.

U.S. Pat. No. 4,375,430, issued to Sklavounos and assigned to Pfizer Inc., discloses the preparation and purification of certain dipeptide sweetening agents including Alitame.

U.S. Pat. No. 4,774,094, issued to Carroll et al. and assigned to Nabisco Brands, Inc., discloses the use of stabilized L-aspartic acid derivatives in comestibles containing greater than about 2% moisture by being formulated with cooked, aqueous hydrogenated starch hydrolysates having a moisture content of about 10%.

U.S. Pat. No. 4,384,004, issued to Cea et al., discloses solid particles of Aspartame encapsulated by a coating material selected from the group consisting of cellulose, cellulose derivatives, arabinogalactin, gum arabic, polyolefins, waxes, vinyl polymers, gelatin, and zein.

U.S. Pat. Nos. 4,122,195 and 4,139,939, issued to Bahoshy et al., discloses a spray dried mixture of Aspartame, a film forming agent, and a material such as gum arabic or the reaction product of a compound containing a polyvalent metallic ion, with an ungelatinized acid-ester of a substituted dicarboxylic acid.

U.S. Pat. No. 4,374,858, issued to Glass et al., discloses a sweetened chewing gum comprising Aspartame having improved sweetness stability when Aspartame is coated on the surface of the chewing gum.

U.S. Pat. No. 4,375,430, issued to Sklavounos and assigned to Pfizer, Inc., discloses the preparation and purification of certain dipeptide sweetening agents including Alitame.

U.S. Pat. No. 3,389,000, issued to Toyonaka et al disclose drying process for preparing granular coated nucleoside-5-phosphates. The coating layers may be edible animal and plant fats melting between 40° C. and 100° C. such as hydrogenated oils including soybean oil, cottonseed oil, almond oil, castor oil, linseed oil, mustard oil, olive oil, grapefruit seed oil, palm oil, palm kernel oil, rapeseed oil, and rice bran oil.

U.S. Pat. No. 4,293,572, issued to Silva et al., discloses a dispersion of an emulsified fat with a solution of dextrin, Saccharin, or a polysaccharide, which is applied to a food product as a barrier against moisture.

European patent application No. 81110320.0, published Jun. 16, 1982, to Ajinomoto-Co., Inc., discloses a stabilized dipeptide-based sweetening composition comprising in percentages by weight (a) from 20% to 60% of solid fat, (b) from 10% to 30% of emulsifier, (c) from 10% to 30% of polysaccharide, and (d) not more than 30% of a dipeptide sweetening agent. The compositions are prepared by spray coating the sweetening agent, or by heating and mixing a mixture of sweetening agent and coating material, cooling the mixture, and then pulverizing the mixture to obtain powder or granules.

U.S. Pat. Nos. 4,752,485 and 4,597,970, both issued to Sharma et al., disclose a sweetening agent delivery system, and a chewing gum incorporating the delivery system, respectively, wherein the delivery system comprises a high intensity sweetening agent coated with a mixture of fatty acid or wax, lecithin, and a glyceride. The delivery system protects and controls release of the sweetening agent. U.S. Pat. No. 4,804,548, issued to Sharma et al., discloses a sweetening agent and flavoring agent delivery system wherein the delivery system comprises a core material comprising a mixture selected from the group consisting of sweetening agents and flavoring agents, wherein the core is coated with a mixture of fatty acid or wax, lecithin, and a glyceride.

U.S. Pat. No. 4,722,845, issued to Cherukuri et al., discloses a cinnamon flavored chewing gum which contains a sweetening agent delivery system which comprises an amino acid or dipeptide sweetening agent encapsulated with a hydrogenated fat, a polyethylene wax having a melting point of 106° C. or greater, and a glyceride.

U.S. Pat. No. 4,816,265, issued to Cherukuri et al., discloses a chewing gum composition containing a sweetening agent delivery system which consists essentially of (a) at least one solid natural or artificial high intensity sweetening agent present in an amount from about 0.01% to about 50%, (b) an emulsifying agent present in an amount from about 0.5% to about 20%, and (c) polyvinyl acetate present in an amount from about 40% to about 93% and having a molecular weight range from about 2,000 to about 14,000.

U.S. Pat. No. 4,711,784, issued to Yang, discloses a chewing gum composition containing an encapsulation composition which comprises a blend of polyvinyl acetate having a molecular weight range from about 20,000 to about 100,000 and a hydrophobic plasticizer.

Hence, a number of encapsulation methods are known for coating high intensity sweetening agents which have varying degrees of effectiveness in protecting and controlling the release of the core material. None of these methods, however, are entirely satisfactory for encapsulating difficult to coat high intensity sweetening agents and extending sweetness release Accordingly, an encapsulation method which can uniformly coat a sweetening agent with a flexible polymeric coating layer and intimately bind the sweetening agent to the polymeric matrix to delay sweetness release is desirable. The present invention provides such improved sweetening agent delivery systems having prolonged sweetness release. The sweetening agent delivery systems may be used in a wide variety of ingestible products such as chewing gum compositions, hard and soft confections, and beverages.

SUMMARY OF THE INVENTION

The present invention is a directed at a sweetening agent delivery system having prolonged sweetness release prepared by a method which comprises the steps of (A) providing the following ingredients in percentages by weight of the sweetening agent delivery system (a) a solution of a high intensity sweetening agent, wherein the sweetening agent is present in an amount from about 0.01% to about 60%, (b) polyvinyl acetate present in an amount from about 40% to about 93% and having a molecular weight in the range from about 2,000 to about 100,000, (c) a plasticizing agent present in an amount from about 0.1% to about 20%, (d) a waxy material having a melting point from about 30° C. to about 120° C. present in an amount from about 0.5% to about 40%, (e) an emulsifying agent present in an amount from about 0.1% to about 20%, and (B) melting and blending the polyvinyl acetate with the plasticizing agent to form a uniform mixture, (C) admixing the solution of high intensity sweetening agent with the melted mixture from step (B) and evaporating the solvent to form a uniform mixture, (D) admixing the waxy material and the emulsifying agent with the mixture from step (C) to form a uniform mixture, (E) cooling and blending the mixture from step (D), and (F) granulating the mixture from step (E). The sweetening agent delivery systems may be used in a wide variety of ingestible products such as chewing gum compositions, hard and soft confections, and beverages. The present invention also pertains to methods for preparing the sweetening agent delivery systems and the ingestible products in which they may be used.

BRIEF DESCRIPTION OF THE DRAWING

FIG. 1 depicts in graphic format the sweetness intensities found for a sweetening agent delivery system prepared according to the method of the present invention and a control sweetening agent delivery system at equivalent sweetness levels in chewing gum compositions at different chew out times (Examples 1-2).

DETAILED DESCRIPTION OF THE INVENTION

Encapsulated sweetening agents are generally prepared by adding and mixing a high intensity sweetening agent in solid form to a melted mixture of a coating material such as polyvinyl acetate and a plasticizing agent. Applicants have discovered that by admixing a solution of a high intensity sweetening agent to a melted mixture of polyvinyl acetate and evaporating the solvent, a sweetening agent delivery system having improved prolonged sweetness release can be obtained. Polyvinyl acetate is a water miscible polymer which has an affinity for many sweetening agent solutions especially aqueous solutions. Applicants believe that solutions of high intensity sweetening agents form intimate mixtures with the polyvinyl acetate polymeric matrix and that after the solvent is evaporated, the intense sweetener recrystallizes in, and becomes an integral part of, the polymeric matrix. The combination of waxy material and emulsifying agent added to the matrix helps prevent cold flow of the final sweetening agent granules. The resulting sweetening agent delivery system has a prolonged sweetness release when used in ingestible compositions.

The terms "ingestible" and "edible", as used herein, refer to all materials and compositions which are used by or which perform a function in the body. These materials and compositions include those which are adsorbed and those which are not absorbed as well as those which are digestible and non-digestible.

The sweetening agents (sweeteners) useful in the core of the sweetening agent delivery systems in the present invention are high intensity sweetening agents which have a sweetness intensity substantially greater than that of sucrose. Suitable high intensity sweetening agents include water-soluble natural sweetening agents such as dihydrochalcones, monellin, Stevia Rebaudiana (steviosides), glycyrrhizin, and mixtures thereof. Suitable water-soluble artificial sweetening agents include saccharin and its soluble salts, i.e., sodium and calcium saccharin salts, cyclamate and its salts, 3,4-dihydro-6-methyl-1,2,3-oxathiazine-4-one-2,2-dioxide (Acesulfame) and the sodium, ammonium, and calcium salts thereof, and especially the potassium salt of 3,4-dihydro-6-methyl-1,2,3-oxathiazine-4-one-2,2-dioxide (Acesulfame-K).

Suitable dipeptide based sweetening agents include L-aspartic acid derived sweetening agents such as L-aspartyl-L-phenylalanine methyl ester (Aspartame), compounds described in U.S. Pat. No. 3,492,131, L-alpha-aspartyl-N-(2,2,4,4-tetramethyl-3-thietanyl)-D-alaninamide hydrate (Alitame), methyl esters of L-aspartyl-L-phenylglycerine and L-aspartyl-L-2,5-dihydrophenylglycine, L-aspartyl-2,5-dihydro-L-phenylalanine, and L-aspartyl-L-(1-cyclohexen)alanine.

Other suitable water-soluble sweetening agents include those derived from naturally occurring water-soluble sweetening agents such as chlorinated derivatives of sucrose, e.g., chlorodeoxysugar derivatives such as derivatives of chlorodeoxysucrose and chlorodeoxygalactosucrose. Examples of chlorodeoxysucrose and chlorodeoxygalactosucrose derivatives include but are not limited to 1-chloro-1'-deoxysucrose; 4-chloro-4-deoxy-alpha-D-galacto-pyranosyl-alpha-D-fructofuranoside, or 4-chloro-4-deoxygalactosucrose; 4-chloro-4-deoxy-alpha-D-galacto-pyranosyl-1-chloro-1-deoxy-beta-D-fructofuranoside, or 4,1'-dichloro-4,1'-dideoxygalactosucrose; 1',6'-dichloro-1',6'-dideoxysucrose; 4-chloro-4-deoxy-alpha-D-galacto-pyranosyl-1,6-dichloro-1,6-dideoxy-beta-D-fructo-furanoside, or 4,1',6'-trichloro-4,1',6'-trideoxygalacto-sucrose; 4,6-dichloro-4,6-dideoxy-alpha-D-galacto-pyranosyl-6-chloro-6-deoxy-beta-D-fructofuranoside, or 4,6,6'-trichloro-4,6,6'-trideoxygalactosucrose; 6,1',6'-trichloro-6,1',6'-trideoxysucrose; 4,6-dichloro-4,6-dideoxy-alpha-D-galacto-pyranosyl-1,6-dichloro-1,6-di-deoxy-beta-D-fructofuranoside, or 4,6,1',6'-tetrachloro-4,6,1',6'-tetradeoxygalactosucrose; and 4,6,1',6'-tetrachloro-4,6,1',6'-tetradeoxysucrose. In a preferred embodiment, the chlorodeoxysugar derivative is 4,1',6'-trichloro-4,1',6'-trideoxygalactosucrose, or 4-chloro-4-deoxy-alpha-D-galactopyranosyl-1,6-dichloro-1,6-dideoxy-beta-D-fructofuranoside, which is commercially available under the tradename Sucralose from McNeil Specialty Products Company, Skillman, N.J.

Other suitable high intensity sweetening agents include protein based sweetening agents such as talin (thaumaoccous danielli, Thaumatin I and II).

Synergistic sweetening agent combinations known in the art may also be employed in the sweetening agent delivery systems of the present invention. For example, synergistic combinations include the combination of Acesulfame-K and Alitame, as disclosed in U.S. Pat. No. 4,536,396; the combination of a chlorodeoxysugar and a sweetening agent selected from the group consisting of Saccharin, stevioside, and Acesulfame-K, as disclosed in U.S. Pat. No. 4,495,170; the combination of Sucralose and Aspartame and the combination of Sucralose and Alitame, as disclosed in U.S. patent application Ser. No. 230,282, filed Aug. 9, 1988; the combination of Sucralose and maltitol, as disclosed in U.S. Pat. No. 4,959,225; the combination of Acesulfame-K and Aspartame, and the combination of Acesulfame-K and Cyclamates, and the combination of Acesulfame-K and Saccharin, as disclosed in U.S. Pat. No. 4,158,068;, the combination of Alitame and Aspartame, as disclosed in U.S. patent application Ser. No. 354,651, filed May 19, 1989; and the combination of Aspartame and Saccharin, as disclosed in U.S. Pat. No. 3,780,189. The above disclosures are incorporated herein by reference.

In a preferred embodiment, the high intensity sweetening agent is selected from the group consisting of saccharin and its salts, cyclamate and its salts, Acesulfame-K, Aspartame, Alitame, and Sucralose. In a more preferred embodiment, the high intensity sweetening agent is selected from the group consisting of Acesulfame-K, Aspartame, Alitame, and Sucralose. In a most preferred embodiment, the high intensity sweetening agent is Sucralose. While applicants may use the trade names of many of the sweetening agents hereafter for convenience, applicants intend to describe and claim the sweetening agents generically.

The amount of the high intensity sweetening agent employed in the sweetening agent delivery system is an effective amount to sweeten an edible composition. The exact amount of the high intensity sweetening agent employed is a matter of preference subject to such factors as the type of high intensity sweetening agent employed, the type of polyvinyl acetate employed, as well as the other ingredients in the composition and the strength of sweetness desired. Thus, the amount of high intensity sweetening agent may be varied in order to obtain the result desired in the final product and such variations are within the capabilities of those skilled in the art without the need for undue experimentation. In general, the amount of high intensity sweetening agent normally present in a sweetening agent delivery system will be from about 0.1% to about 60%, preferably from about 1% to about 30%, and more preferably from about 3% to about 15%, by weight of the sweetening agent delivery system.

The high intensity sweetening agents of the present invention are incorporated into the sweetening agent delivery system in solution form. The solvents useful in the sweetening agent solutions are solvents in which the high intensity sweetening agents are soluble. The solvents may be water, nonaqueous solvents, and mixtures thereof. The solvent must have a boiling point sufficiently low so that the solvent can be evaporated from the polyvinyl acetate polymeric matrix without leaving a residue or otherwise adversely affecting the polyvinyl acetate polymer or sweetening agent. In general, the solvent used in the sweetening agent solutions will have a boiling point in the range from about 30° C. to about 110° C., preferably from about 50° C. to about 105° C., and more preferably from about 80° C. to about 100° C. Suitable solvents in the present invention include water, ethanol, acetone, ethyl acetate, chloroform, and mixtures thereof. The preferred solvent is water.

The coating layer material in the present invention is polyvinyl acetate. Polyvinyl acetate is a thermoplastic, high polymer prepared by the polymerization of vinyl acetate with peroxide catalysts. Polyvinyl acetate is a colorless, odorless, tasteless, nontoxic, and transparent solid which is insoluble in water and soluble in low molecular weight alcohols and esters. In a preferred embodiment, the polyvinyl acetate has a molecular weight in the range from about 2,000 to about 100,000, more preferably from about 10,000 to about 60,000, and most preferably from about 40,000 to about 50,000. Because polyvinyl acetate is substantially water-insoluble, a polyvinyl acetate coating layer protects the sweetening agent from hydrolytic degradation. Nevertheless, polyvinyl acetate possesses sufficient hydrophilic character to swell in the presence of water and slowly release the sweetening agent core material.

The amount of polyvinyl acetate employed in the sweetening agent delivery system is an effective amount to protect the sweetening agent from degradation and to slowly release the sweetening agent core material. The exact amount of the polyvinyl acetate employed is a matter of preference subject to such factors as the type of polyvinyl acetate employed, the type and amount of high intensity sweetening agent employed, as well as the other ingredients in the composition and the degree of prolonged sweetness release desired. In general, the amount of polyvinyl acetate normally present in a sweetening agent delivery system will be from about 40% to about 93%, preferably from about 60% to about 90%, and more preferably from about 70% to about 85%, by weight of the sweetening agent delivery system.

Plasticizing agents (plasticizers) are organic molecules added to a polymer to facilitate processing and to increase the flexibility and toughness of the final product by internally modifying (solvating) the polymer molecule. Plasticizing agents should be soluble in the polymer they are designed to plasticize, should not be highly water-soluble, and should be safe for the intended use. Suitable plasticizing agents in the present invention may be selected from the group consisting of acetylated monoglyceride, esters of phthalic acid, adipic acid, sebacic acid, polyols such as ethylene glycol and its derivatives, tricresyl phosphate, castor oil, dibutyl sebacate, triethyl citrate, tributyl citrate, triacetin, acetylated mono-, di- and triglycerides, acetyltriethylcitrate, triethylcitrate, acetyltributylcitrate, tributylcitrate, and the like, and mixtures thereof. In a preferred embodiment, the plasticizing agent of the present invention is selected from the group consisting of acetylated monoglyceride, triacetin, and mixtures thereof. In a more preferred embodiment, the plasticizing agent is acetylated monoglyceride.

The amount of the plasticizing agent employed in the sweetening agent delivery system is an effective amount to facilitate processing and to increase the flexibility and toughness of the final delivery system. In general, the amount of plasticizing agent normally present in a sweetening agent delivery system will be from about 0.1% to about 20%, preferably from about 1% to about 10%, and more preferably from about 2% to about 5%, by weight of the sweetening agent delivery system.

The waxy material in the present invention is a low melting point wax employed to inhibit cold flow of the polyvinyl acetate granules. The waxy material must have a melting point sufficiently low so that the material will melt and blend with the sweetening agent and polyvinyl acetate mixture during the preparation of the delivery system. The melting point of the waxy material must also be sufficiently high so that the waxy material will be solid in the final delivery system under ambient conditions to inhibit cold flow of the polyvinyl acetate. In general, the waxy material will have a melting point in the range from about 30° C. to about 120° C., preferably from about 40° C. to about 80° C., and more preferably from about 50° C. to about 70° C.

The waxy materials useful in the present invention are selected from the group consisting of fatty acids, natural waxes, synthetic waxes, and the like, and mixtures thereof. Fatty acids are carboxylic acids derived from or contained in an animal or vegetable fat or oil. Fatty acids are composed of a chain of alkyl groups containing from 4 to 22 carbon atoms and are characterized by a terminal carboxyl group. Waxes are low-melting organic mixtures or compounds having a high molecular weight, are solid at room temperature, and generally are similar in composition to fats and oils except that waxes contain no glycerides. Waxes may be hydrocarbons or esters of fatty acids and alcohols. Fatty acids and waxes are both classified as lipids.

The fatty acids useful in the present invention are acids which have an iodine value from about 1 to about 10. The iodine value is a means of determining the degree of unsaturation in a fat or oil. The measurement of iodine values is determined by known titrating methods and is reported in terms of centigrams of iodine absorbed per gram of fat or oil sample titrated (See "Bailey's Industrial Oil and Fat Products," Vol. 2, 4th Ed., Swern, Daniel ed., pp. 436–438 (1982)). Hence the fatty acids useful in the present invention have an iodine value from about 1 centigram to about 10 centigrams.

Fatty acids useful in the present invention are selected from the group consisting of hydrogenated palm oil, hydrogenated palm kernel oil, hydrogenated peanut oil, hydrogenated rapeseed oil, hydrogenated rice bran oil, hydrogenated soybean oil, hydrogenated cottonseed oil, hydrogenated sunflower oil, hydrogenated castor oil, and the like, and mixtures thereof. Other fatty acids include, for example, decenoic acid, docosanoic acid, stearic acid, palmitic acid, lauric acid, myristic acid, and the like, and mixtures thereof. The preferred fatty acids are selected from the group consisting hydrogenated soybean oil, hydrogenated palm oil, hydrogenated castor oil, hydrogenated cottonseed oil, stearic acid, palmitic acid, and mixtures thereof. In a preferred embodiment, the waxy material is Durkee 17, a hydrogenated soybean oil having a melting point from about 67° C. to about 70° C., commercially available from Durkee (Vandenbergh).

Waxes useful in the present invention include natural waxes, such as animal waxes, vegetable waxes, and petroleum waxes (i.e., paraffin waxes, microcrystalline waxes, petrolatum waxes, mineral waxes), and synthetic waxes which are edible and have a melting point within the range from about 30° C. to about 120° C. Specific examples of useful waxes are spermaceti wax, carnauba wax, Japan wax, bayberry wax, flax wax, beeswax, Chinese wax, shellac wax, lanolin wax, sugarcane wax, candelilla wax, paraffin wax, microcrystalline wax, petrolatum wax, carbowax, and the like, and mixtures thereof. Mixtures of these waxes with the fatty acids set out above may also be used. The preferred waxes are selected from the group consisting of carnauba wax, bees wax, glyceryl tristearate, glyceryl monostearate, paraffin wax, microcrystalline wax, glyceryl distearate, and mixtures thereof. The most preferred waxes are carnauba wax, bees wax, glyceryl tristearate, glyceryl monostearate, and paraffin wax.

The wax may also be an ester of a fatty acid having from about 12 to about 31 carbon atoms and a fatty alcohol having from about 12 to about 31 carbon atoms, the ester having a carbon atom content from about 24 to about 62 carbon atoms. Examples of such fatty acid esters are myricyl palmitate, ceryl palmitate, ceryl cerotate, myricyl melissate, stearyl palmitate, stearyl myristate, lauryl laurate, and the like, and mixtures thereof. The preferred fatty acid esters are selected from the group consisting of stearyl palmitate, stearyl myristate, and mixtures thereof.

The wax may also be a monoglyceryl ester, diglyceryl ester, or triglyceryl ester (glycerides) which is an ester formed from a fatty acid having from about 10 to about 22 carbon atoms and glycerol, wherein one or more of the hydroxyl groups of glycerol is substituted by a fatty acid. Examples of useful glycerides include glyceryl monostearate, glyceryl distearate, glyceryl tristearate, glyceryl dipalmitate, glyceryl tripalmitate, glyceryl monopalmitate, glyceryl dilaurate, glyceryl trilaurate, glyceryl monolaurate, glyceryl didocosanoate, glyceryl tridocosanoate, glyceryl monodocosanoate, glyceryl monocaproate, glyceryl dicaproate, glyceryl tricaproate, glyceryl monomyristate, glyceryl dimyristate, glyceryl trimyristate, glyceryl monodecenoate, glyceryl didecenoate, glyceryl tridecenoate, and the like, and mixtures thereof. The preferred glycerides are selected from the group consisting of glyceryl monostearate, glyceryl distearate, glyceryl tristearate, and mixtures thereof.

The wax may also be a synthetic wax such as polyethylene wax, copolymers of polyethylene and polypropylene wax, and mixtures thereof. The animal waxes, vegetable waxes, petroleum waxes, and synthetic waxes set out above may be blended to provide waxy materials having a melting point within the range from about 30° C. to about 120° C.

The amount of the waxy material employed in the sweetening agent delivery system is an effective amount to inhibit cold flow of the polyvinyl acetate granules. In general, the amount of waxy material normally present in a sweetening agent delivery system will be from about 0.5% to about 40%, preferably from about 2% to about 20%, and more preferably from about 4% to about 10%, by weight of the sweetening agent delivery system.

Emulsifying agents (emulsifiers, surfactants, surface active agents, wetting agents) are compounds which reduce surface tension when dissolved in water or which reduce interfacial tension between two liquids or a liquid and a solid. Emulsifying agents can aid in the dispersion of immiscible components into a single stable system. The emulsifying agents in the present invention are compounds which will disperse the waxy material in the melted mixture of polyvinyl acetate and high intensity sweetening agent. The emulsifying agent is preferably a nonionic emulsifying agent.

Nonionic emulsifying agents useful in the present invention include polyoxyethylene sorbitan fatty acid esters (polysorbates, polyethylene oxide sorbitan esters), which are the condensates of sorbitol esters of fatty acids with ethylene oxide. Polysorbates are available commercially as "Tweens," a trademark of ICI United States, Inc. Particularly preferred polysorbates are Polysorbate 20 (sorbitan, monododecanoate, poly-(oxy-1,2-ethanediyl derivative, polyoxyethylene 20 sorbitan monolaurate, Tween 20) and Polysorbate 80 (sorbitan, mono-9-octadecanoate, poly(oxy-1,2-ethanediyl derivative, polyoxyethylene 20 sorbitan monooleate, Tween 80).

Other useful nonionic emulsifiers include lecithin, fatty acid monoglycerides (dimodan), acetylated monoglycerides (G002, cetodan), diglycerides, glyceryl monostearate, propylene glycol monostearate, stearic acid, oleic acid, polyethylene glycol, and the like, and mixtures thereof. The preferred nonionic emulsifying agents are selected from the groups consisting of acetylated monoglycerides, glyceryl monostearate, stearic acid, and the like, and mixtures thereof. The more preferred nonionic emulsifying agent is glyceryl monostearate.

The amount of emulsifying agent employed in the sweetening agent delivery system is an effective amount to disperse the waxy material in the melted mixture of polyvinyl acetate and high intensity sweetening agent. In general, the amount of emulsifying agent normally present in a sweetening agent delivery system will be from about 0.1% to about 20%, preferably from about 0.5% to about 10%, and more preferably from about 3% to about 7%, by weight of the sweetening agent delivery system.

The combination of the high intensity sweetening agent, polyvinyl acetate present having a molecular weight in the range from about 2,000 to about 100,000, plasticizing agent, waxy material having a melting point from about 30° C. to about 120° C., and emulsifying agent in the present invention provides a sweetening agent delivery system having prolonged sweetness release. The sweetening agent delivery system may be used in a wide variety of ingestible products such as chewing gum compositions, hard and soft confections, and beverages.

The present invention extends to methods for preparing the sweetening agent delivery systems. In such a method, the sweetening agent delivery system is prepared by melting and blending the polyvinyl acetate with the plasticizing agent at a temperature in the range from about 80° C. to about 120° C. to form a uniform mixture. A solution of a high intensity sweetening agent is then admixed with the polyvinyl acetate and plasticizing agent mixture at a temperature in the range from about 70° C. to about 110° C. to form a uniform mixture. The solution is added at a rate so that the solvent evaporates readily. The waxy material and the emulsifying agent are then admixed and added to the high intensity sweetening agent/polyvinyl acetate mixture at a temperature in the range from about 70° C. to about 90° C. to form a uniform mixture. The mixture is cooled with continued mixing until hard and then granulated to a desired particle size. The sweetening agent delivery system is in powder or granular form. The particle size is not critical to the delivery system and can be adjusted to accommodate a particular desired release rate and mouth feel, depending on the carrier in which it is incorporated.

The final compositions are readily prepared using standard methods and apparatus generally known by those skilled in the confectionery arts. The apparatus useful in accordance with the present invention comprises mixing apparatus well known in the confectionery arts, and therefore the selection of the specific apparatus will be apparent to the artisan.

In a preferred embodiment, the present invention is directed at a method for preparing a sweetening agent delivery system having prolonged sweetness release which comprises the steps of:

(A) providing the following ingredients in percentages by weight of the sweetening agent delivery system:
  (a) a solution of a high intensity sweetening agent, wherein the sweetening agent is present in an amount from about 0.01% to about 60%;
  (b) polyvinyl acetate present in an amount from about 40% to about 93% and having a molecular weight in the range from about 2,000 to about 100,000;
  (c) a plasticizing agent present in an amount from about 0.1% to about 20%;
  (d) a waxy material having a melting point from about 30° C. to about 120° C. present in an amount from about 0.5% to about 40%;
  (e) an emulsifying agent present in an amount from about 0.1% to about 20%;
(B) melting and blending the polyvinyl acetate with the plasticizing agent to form a uniform mixture;
(C) admixing the solution of high intensity sweetening agent with the melted mixture from step (B) and evaporating the solvent to form a uniform mixture;
(D) admixing the waxy material and the emulsifying agent with the mixture from step (C) to form a uniform mixture;
(E) cooling and blending the mixture from step (D); and
(F) granulating the mixture from step (E).

Once prepared, the inventive sweetening agent delivery system may be stored for future use or may be formulated in effective amounts with conventional additives, such as pharmaceutically acceptable carriers or confectionery ingredients to prepare a wide variety of ingestible compositions, such as foodstuffs, beverages, jellies, extracts, hard and soft confectionery products, orally administered pharmaceutical compositions, and hygienic products such as toothpastes, dental lotions, mouth washes, and chewing gums.

The amount of the inventive sweetening agent delivery system employed in an ingestible composition is an effective amount to sweeten the ingestible composition. The exact amount of the sweetening agent delivery system employed is a matter of preference, subject to such factors as the type of pharmaceutically acceptable carrier employed in the composition and the strength of sweetness desired. Thus, the amount of sweetening agent composition may be varied in order to obtain the result desired in the final product and such variations are within the capabilities of those skilled in the art without the need for undue experimentation. In general, the amount of sweetening agent delivery system normally present in an ingestible composition will be from about 0.01% to about 40%, preferably from about 0.1% to about 15%, and more preferably from about 1% to about 10%, by weight of the ingestible composition.

The present invention extends to methods for making the ingestible compositions. In such a method, a composition is made by admixing an effective amount of the sweetening agent delivery system of the present invention with a pharmaceutically acceptable carrier or confectionery material and the other ingredients of the final desired ingestible composition. Other ingredients will usually be incorporated into the composition as dictated by the nature of the desired composition as well known by those having ordinary skill in the art. The ultimate ingestible compositions are readily prepared using methods generally known in the food technology and pharmaceutical arts.

In another embodiment, the present invention is directed at a method for sweetening an edible composition which comprises admixing an effective amount of the sweetening agent delivery system with the edible composition.

An important aspect of the present invention includes an improved chewing gum composition incorporating the inventive sweetening agent delivery system and a method for preparing the chewing gum composition, including both chewing gum and bubble gum formulations. In general, the improved chewing gum compositions will contain a gum base, a bulking agent, an effective amount of the inventive sweetening agent delivery system, and various additives such as a flavoring agent.

The chewing gum compositions may be reduced-calorie chewing gums employing high levels of a chewing gum base having an enhanced hydrophilic character. These reduced-calorie chewing gums will comprise a gum base present in an amount from about 50% to about 85%, preferably from about 50% to about 75%, and more preferably from about 60% to about 70%, by weight of the chewing gum composition. When a reduced-calorie product is not desired, the chewing gum composition may contain lower amounts of a chewing gum base. These chewing gums will comprise a gum base present in an amount up to about 55%, preferably from about 15% to about 40%, and more preferably from about 20% to about 35%, by weight of the chewing gum composition.

As used herein, the term "reduced-calorie composition" means a composition having a caloric value two thirds or less than that of a conventional composition. The term "tight" or "rubbery" chew refers to a chewing gum composition which requires a large amount of muscular chewing effort to masticate or to a composition which provides a gum bolus with high elasticity and bounce and which is difficult to deform.

Gum bases having an enhanced hydrophilic character include polyvinyl acetate gum bases which may also contain a low melting point wax. Such gum bases do not require a high level of bulking agent to plasticize the gum base and render it soft during chewing. These gum bases may be used at higher than normal levels in chewing gum compositions in place of a bulking and/or a bulk sweetening agent to prepare high base-low bulking agent reduced-calorie gums which do not have rubbery or tight chew characteristics. These gum bases possess increased hydrophilic properties over conventional gum bases and appear to increase in size during chewing releasing flavoring and sweetening agents which would normally be entrapped in the gum base while maintaining a soft chew texture. Reduced-calorie chewing gum compositions prepared with such gum bases in high levels are less hygroscopic (have lower moisture-pickup) and are less prone to becoming stale than conventional reduced-calorie gum compositions while having comparable firmness and texture.

The elastomers (rubbers) employed in the gum base of the present invention will vary greatly depending upon various factors such as the type of gum base desired, the consistency of gum composition desired and the other components used in the composition to make the final chewing gum product. The elastomer may be any water-insoluble polymer known in the art, and includes those gum polymers utilized for chewing gums and bubble gums. Illustrative examples of suitable polymers in gum bases include both natural and synthetic elastomers. For example, those polymers which are suitable in gum base compositions include, without limitation, natural substances (of vegetable origin) such as chicle, natural rubber, crown gum, nispero, rosidinha, jelutong, perillo, niger gutta, tunu, balata, guttapercha, lechi capsi, sorva, gutta kay, and the like, and mixtures thereof. Examples of synthetic elastomers include, without limitation, styrene-butadiene copolymers (SBR), polyisobutylene, isobutylene-isoprene copolymers, polyethylene, and the like, and mixtures thereof.

The amount of elastomer employed in the gum base will vary greatly depending upon various factors such as the type of gum base used, the consistency of the gum composition desired and the other components used in the composition to make the final chewing gum product. In general, the elastomer will be present in the gum base in an amount from about 0.5% to about 20%, and preferably from about 2.5% to about 15%, by weight of the gum base.

The polyvinyl acetate polymer employed in the gum base of the present invention is a polyvinyl acetate polymer having a medium molecular weight, specifically, having a mean average molecular weight in the range from about 35,000 to about 55,000. This medium molecular weight polyvinyl acetate polymer will preferably have a viscosity from about 35 seconds to about 55 seconds (ASTM designation D1200-82 using a Ford cup viscometer procedure). The medium molecular weight polyvinyl acetate polymer will be present in the gum base in an amount from about 10% to about 25%, and preferably from about 12% to about 27%, by weight of the gum base.

The medium molecular weight polyvinyl acetate polymer may also be blended with a low molecular weight polyvinyl acetate polymer. The low molecular weight polyvinyl acetate polymer will have a mean average molecular weight in the range from about 12,000 to about 16,000. This low molecular weight polyvinyl acetate polymer will preferably have a viscosity from about 14 seconds to about 16 seconds (ASTM designation D1200-82 using a Ford cup viscometer procedure). The low molecular weight polyvinyl acetate polymer will be present in the gum base in an amount up about 17%, and preferably from about 12% to about 17%, by weight of the gum base.

When a low molecular weight polyvinyl acetate polymer is blended with a medium molecular weight polyvinyl acetate polymer, the polymers will be present in a mole ratio from about 1:0.5 to about 1:1.5, respectively.

The medium molecular weight polyvinyl acetate polymer may also be blended with a high molecular weight polyvinyl acetate polymer. The high molecular weight polyvinyl acetate polymer will have a mean average molecular weight in the range from about 65,000 to about 95,000. The high molecular weight polyvinyl acetate polymer will be present in the gum base in an amount up to about 5%, by weight of the gum base.

The acetylated monoglycerides in the present invention, like the polyvinyl acetate polymer, serve as plasticizing agents. While the saponification value of the acetylated monoglycerides is not critical, preferable saponification values are 278 to 292, 316 to 331, 370 to 380, and 430 to 470. A particularly preferred acetylated monoglyceride has a saponification value above about 400. Such acetylated monoglycerides generally have an acetylation value (percentage acetylated) above about 90 and a hydroxyl value below about 10 (Food Chemical Codex (FCC) III/P508 and the revision of AOCS).

The use of acetylated monoglycerides in the present gum base is preferred over the use of bitter polyvinyl acetate (PVA) plasticizers, in particular, triacetin. The acetylated monoglycerides will be present in the gum base in an amount from about 4.5% to about 10%, and preferably from about 5% to about 9%, by weight of the gum base.

The wax in the gum base of the present invention softens the polymeric elastomer mixture and improves the elasticity of the gum base. The waxes employed will have a melting point below about 60° C., and preferably between about 45° C. and about 55° C. A preferred wax is low melting paraffin wax. The wax will be present in the gum base in an amount from about 6% to about 10%, and preferably from about 7% to about 9.5%, by weight of the gum base.

In addition to the low melting point waxes, waxes having a higher melting point may be used in the gum base in amounts up to about 5%, by weight of the gum base. Such high melting waxes include beeswax, vegetable wax, candelilla wax, carnauba wax, most petroleum waxes, and the like, and mixtures thereof.

In addition to the components set out above, the gum base includes a variety of traditional ingredients, such as a component selected from the group consisting of elastomer solvents, emulsifiers, plasticizers, fillers, and mixtures thereof. These ingredients are present in the gum base in an amount to bring the total amount of gum base to 100%.

The gum base may contain elastomer solvents to aid in softening the elastomer component. Such elastomer solvents may comprise those elastomer solvents known in the art, for example, terpinene resins such as polymers of alpha-pinene or beta-pinene, methyl, glycerol and pentaerythritol esters of rosins and modified rosins and gums, such as hydrogenated, dimerized and polymerized rosins, and mixtures thereof. Examples of elastomer solvents suitable for use herein include the pentaerythritol ester of partially hydrogenated wood and gum rosin, the pentaerythritol ester of wood and gum rosin, the glycerol ester of wood rosin, the glycerol ester of partially dimerized wood and gum rosin, the glycerol ester of polymerized wood and gum rosin, the glycerol ester of tall oil rosin, the glycerol ester of wood and gum rosin and the partially hydrogenated wood and gum rosin and the partially hydrogenated methyl ester of wood and rosin, and the like, and mixtures thereof. The elastomer solvent may be employed in the gum base in amounts from about 2% to about 15%, and preferably from about 7% to about 11%, by weight of the gum base.

The gum base may also include emulsifiers which aid in dispersing the immiscible components into a single stable system. The emulsifiers useful in this invention include glyceryl monostearate, lecithin, fatty acid monoglycerides, diglycerides, propylene glycol monostearate, and the like, and mixtures thereof. A preferred emulsifier is glyceryl monostearate. The emulsifier may be employed in amounts from about 2% to about 15%, and preferably from about 7% to about 11%, by weight of the gum base.

The gum base may also include plasticizers or softeners to provide a variety of desirable textures and consistency properties. Because of the low molecular weight of these ingredients, the plasticizers and softeners are able to penetrate the fundamental structure of the gum base making it plastic and less viscous. Useful plasticizers and softeners include lanolin, palmitic acid, oleic acid, stearic acid, sodium stearate, potassium stearate, glyceryl triacetate, glyceryl lecithin, glyceryl monostearate, propylene glycol monostearate, acetylated monoglyceride, glycerine, and the like, and mixtures thereof. Waxes, for example, natural and synthetic waxes, hydrogenated vegetable oils, petroleum waxes such as polyurethane waxes, polyethylene waxes, paraffin waxes, microcrystalline waxes, fatty waxes, sorbitan monostearate, tallow, propylene glycol, mixtures thereof, and the like, may also be incorporated into the gum base. The plasticizers and softeners are generally employed in the gum base in amounts up to about 20%, and preferably in amounts from about 9% to about 17%, by weight of the gum base.

Preferred plasticizers are the hydrogenated vegetable oils and include soybean oil and cottonseed oil which may be employed alone or in combination. These plasticizers provide the gum base with good texture and soft chew characteristics. These plasticizers and softeners are generally employed in amounts from about 5% to about 14%, and preferably in amounts from about 5% to about 13.5%, by weight of the gum base.

In another preferred embodiment, the softening agent is anhydrous glycerin, such as the commercially available United States Pharmacopeia (USP) grade. Glycerin is a syrupy liquid with a sweet warm taste and has a sweetness of about 60% of that of cane sugar. Because glycerin is hygroscopic, it is important that the anhydrous glycerin be maintained under anhydrous conditions throughout the preparation of the chewing gum composition.

The gum base of this invention may also include effective amounts of bulking agents such as mineral adjuvants which may serve as fillers and textural agents. Useful mineral adjuvants include calcium carbonate, magnesium carbonate, alumina, aluminum hydroxide, aluminum silicate, talc, tricalcium phosphate, dicalcium phosphate, and the like, and mixtures thereof. These fillers or adjuvants may be used in the gum base compositions in various amounts. Preferably the amount of filler, when used, will be present in an amount from about 15% to about 40%, and preferably from about 20% to about 30%, by weight of the gum base.

A variety of traditional ingredients may be optionally included in the gum base in effective amounts such as coloring agents, antioxidants, preservatives, flavoring agents, and the like. For example, titanium dioxide and other dyes suitable for food, drug and cosmetic applications, known as F. D. & C. dyes, may be utilized. An anti-oxidant such as butylated hydroxytoluene (BHT), butylated hydroxyanisole (BHA), propyl gallate, and mixtures thereof, may also be included. Other conventional chewing gum additives known to one having ordinary skill in the chewing gum art may also be used in the gum base.

The manner in which the gum base components are admixed is not critical and is performed using standard techniques and apparatus known to those skilled in the art. In a typical method, an elastomer is admixed with an elastomer solvent and/or a plasticizer and/or an emulsifier and agitated for a period of from 1 to 30 minutes. After blending is complete, the polyvinyl acetate component is admixed into the mixture. The medium molecular weight polyvinyl acetate is preferably admixed prior to addition of the optional low molecular weight polyvinyl acetate to prevent the creation of pockets of polyvinyl acetate within the elastomer mixture. The remaining ingredients, such as the low melting point wax, are then admixed, either in bulk or incrementally, while the gum base mixture is blended again for 1 to 30 minutes.

In one embodiment, the invention pertains to a reduced-calorie chewing gum composition which comprises a gum base present in an amount from about 40% to about 75%, by weight of the chewing gum composition, which comprises (a) an elastomer present in an amount from about 0.5% to about 20%, by weight of the gum base, (b) a medium molecular weight polyvinyl acetate polymer having a molecular weight from about 35,000 to about 55,000 present in an amount from about 10% to about 25%, by weight of the gum base, (c) an acetylated monoglyceride present in an amount from about 4.5% to about 10%, by weight of the gum base, (d) a wax having a melting point below about 60° C. present in an amount from about 6% to about 10%, by weight of the gum base, and (e) a material selected from the group consisting of elastomer solvents, emulsifiers, plasticizers, fillers, and mixtures thereof, present in an amount to bring the total amount of gum base to 100%, by weight of the gum base.

Chewing gum compositions employing a high level of a chewing gum base having an enhanced hydrophilic character are more fully described in U.S. Pat. No. 4,872,884, which disclosure is incorporated herein by reference.

Other gum bases having an enhanced hydrophilic nature and suitable for use in reduced-calorie chewing gum compositions in high levels may also be employed in the present invention. In general, these gum bases may be employed in amounts up to 99%, preferably from about 40% to about 85%, and more preferably from about 40% to about 75%, by weight of the chewing gum composition. Suitable gum bases having an enhanced hydrophilic nature include, for example, those disclosed in U.S. Pat. No. 4,698,223, which disclosure is incorporated herein by reference. The gum base is formulated with the inventive sweetening agent delivery system and conventional additives such as a bulking agent to prepare a wide variety of sweetened chewing gum compositions.

The amount of gum base employed in the chewing gum composition will vary depending on such factors as the type of gum base used, the consistency desired, and the other components used to make the final chewing gum product. In general, the gum base having an enhanced hydrophilic character will be present in the chewing gum composition in an amount from about 50% to about 85%, preferably from about 50% to about 75%, and more preferably from about 60% to about 70%, by weight of the chewing gum composition.

In another embodiment, the invention pertains to a chewing gum composition which contains lower amounts of a chewing gum base. In general, the gum base in these chewing gum compositions will be present in an amount up to about 55%, preferably from about 15% to about 40%, and more preferably from about 20% to about 35%, by weight of the chewing gum composition. In this embodiment, the gum base will comprise an elastomer and a variety of traditional ingredients such as an elastomer solvent, waxes, emulsifiers, plasticizers or softeners, bulking agents such as mineral adjuvants which may serve as fillers and textural agents, coloring agents, antioxidants, preservatives, flavoring agents, and the like, and mixtures thereof. Illustrative examples of these gum base components have been set out above.

Once prepared, the gum base may be formulated with the sweetening agent delivery system of the present invention and conventional additives to prepare a wide variety of chewing gum compositions.

The chewing gum compositions generally include bulking agents. These bulking agents (carriers, extenders) may be water-soluble and include bulking agents selected from the group consisting of, but not limited to, monosaccharides, disaccharides, polysaccharides, sugar alcohols, and mixtures thereof; isomalt (a racemic mixture of alpha-D-glucopyranosyl-1,6-mannitol and alpha-D-glucopyranosyl-1,6-sorbitol manufactured under the tradename Palatinit by Suddeutsche Zucker), maltodextrins; hydrogenated starch hydrolysates; hydrogenated hexoses; hydrogenated disaccharides; minerals, such as calcium carbonate, talc, titanium dioxide, dicalcium phosphate, celluloses and the and the like, and mixtures thereof. Bulking agents may be used in amounts up to about 60%, and preferably in amounts from about 25% to about 60%, by weight of the chewing gum composition.

Suitable sugar bulking agents include monosaccharides, disaccharides and polysaccharides such as xylose, ribulose, glucose (dextrose), mannose, galactose, fructose (levulose), sucrose (sugar), maltose, invert sugar, partially hydrolyzed starch and corn syrup solids, and mixtures thereof. When the chewing gum composition is a sugar gum, mixtures of sucrose and corn syrup solids are the preferred sugar bulking agents.

Suitable sugar alcohol bulking agents include sorbitol, xylitol, mannitol, galactitol, maltitol, and mixtures thereof. Mixtures of sorbitol and mannitol are the preferred sugar alcohol bulking agents.

Maltitol is a sweet, non-caloric, water-soluble sugar alcohol useful as a bulking agent in the preparation of non-caloric beverages and foodstuffs and is more fully described in U.S. Pat. No. 3,708,396, which disclosure is incorporated herein by reference. Maltitol is made by hydrogenation of maltose which is the most common reducing disaccharide and is found in starch and other natural products.

The gum composition may include effective amounts of conventional additives selected from the group consisting of plasticizers, softeners, emulsifiers, waxes, fillers, mineral adjuvants, flavoring agents (flavors, flavorings), coloring agents (colorants, colorings), antioxidants, acidulants, thickening agents, and the like, and mixtures thereof. These ingredients are present in the chewing gum composition in an amount to bring the total amount of chewing gum composition to 100%. Some of these additives may serve more than one purpose. For example, in sugarless gum compositions, a sweetening agent, such as sorbitol or other sugar alcohol, may also function as a bulking agent.

The plasticizers, softening agents, mineral adjuvants, waxes and antioxidants discussed above, as being suitable for use in the gum base, may also be used in the chewing gum composition. Examples of other conventional additives which may be used include emulsifiers, such as lecithin and glyceryl monostearate, thickening agents, used alone or in combination with other softeners, such as methyl cellulose, alginates, carrageenan, xanthan gum, gelatin, carob, tragacanth, and locust bean, acidulants such as malic acid, adipic acid, citric acid, tartaric acid, fumaric acid, and mixtures thereof, and fillers, such as those discussed above under the category of mineral adjuvants.

The flavoring agents which may be used include those flavors known to the skilled artisan, such as natural and artificial flavors. These flavorings may be chosen from synthetic flavor oils and flavoring aromatics and/or oils, oleoresins and extracts derived from plants, leaves, flowers, fruits, and so forth, and combinations thereof. Nonlimiting representative flavor oils include spearmint oil, cinnamon oil, oil of wintergreen (methyl salicylate), peppermint oil, clove oil, bay oil, anise oil, eucalyptus oil, thyme oil, cedar leaf oil, oil of nutmeg, allspice, oil of sage, mace, oil of bitter almonds, and cassia oil. Also useful flavorings are artificial, natural and synthetic fruit flavors such as vanilla, and citrus oils including lemon, orange, lime, grapefruit, and fruit essences including apple, pear, peach, grape, strawberry, raspberry, cherry, plum, pineapple, apricot and so forth. These flavoring agents may be used in liquid or solid form and may be used individually or in admixture. Commonly used flavors include mints such as peppermint, menthol, artificial vanilla, cinnamon derivatives, and various fruit flavors, whether employed individually or in admixture.

Other useful flavorings include aldehydes and esters such as cinnamyl acetate, cinnamaldehyde, citral diethylacetal, dihydrocarvyl acetate, eugenyl formate, p-methylamisol, and so forth may be used. Generally any flavoring or food additive such as those described in *Chemicals Used in Food Processing*, publication 1274, pages 63–258, by the National Academy of Sciences, may be used.

Further examples of aldehyde flavorings include but are not limited to acetaldehyde (apple), benzaldehyde (cherry, almond), anisic aldehyde (licorice, anise), cinnamic aldehyde (cinnamon), citral, i.e., alpha-citral (lemon, lime), neral, i.e., beta-citral (lemon, lime), decanal (orange, lemon), ethyl vanillin (vanilla, cream), heliotrope, i.e., piperonal (vanilla, cream), vanillin (vanilla, cream), alpha-amyl cinnamaldehyde (spicy fruity flavors), butyraldehyde (butter, cheese), valeraldehyde (butter, cheese), citronellal (modifies, many types), decanal (citrus fruits), aldehyde C-8 (citrus fruits), aldehyde C-9 (citrus fruits), aldehyde C-12 (citrus fruits), 2-ethyl butyraldehyde (berry fruits), hexenal, i.e., trans-2 (berry fruits), tolyl aldehyde (cherry, almond), veratraldehyde (vanilla), 2,6-dimethyl-5-heptenal, i.e., melonal (melon), 2,6-dimethyloctanal (green fruit), and 2-dodecenal (citrus, mandarin), cherry, grape, strawberry shortcake, mixtures thereof and the like.

The flavoring agent may be employed in either liquid form and/or dried form. When employed in the latter form, suitable drying means such as spray drying the oil may be used. Alternatively, the flavoring agent may be absorbed onto water soluble materials, such as cellulose, starch, sugar, maltodextrin, gum arabic and so forth or may be encapsulated. The actual techniques for preparing such dried forms are well known and do not constitute a part of this invention.

The flavoring agents of the present invention may be used in many distinct physical forms well known in the art to provide an initial burst of flavor and/or a prolonged sensation of flavor. Without being limited thereto, such physical forms include free forms, such as spray dried, powdered, and beaded forms, and encapsulated forms, and mixtures thereof.

Encapsulated delivery systems for flavoring agents or sweetening agents comprise a hydrophobic matrix of fat or wax surrounding a sweetening agent or flavoring agent core. The fats may be selected from any number of conventional materials such as fatty acids, glycerides or polyglycerol esters, sorbitol esters, and mixtures thereof. Examples of fatty acids include hydrogenated and partially hydrogenated vegetable oils such as palm oil, palm kernel oil, peanut oil, rapeseed oil, rice bran oil, soybean oil, cottonseed oil, sunflower oil, safflower oil, and mixtures thereof. Glycerides which are useful include monoglycerides, diglycerides, and triglycerides.

Waxes useful may be chosen from the group consisting of natural and synthetic waxes, and mixtures thereof. Non-limiting examples include paraffin wax, petrolatum, carbowax, microcrystalline wax, beeswax, carnauba wax, candellila wax, lanolin, bayberry wax, sugarcane wax, spermaceti wax, rice bran wax, and mixtures thereof.

The fats and waxes may be use individually or in combination in amounts varying from about 10 to about 70%, and preferably in amounts from about 40 to about 58%, by weight of the encapsulated system. When used in combination, the fat and wax are preferably present in a ratio from about 70:10 to 85:15, respectively.

Typical encapsulated flavoring agent or sweetening agent delivery systems are disclosed in U.S. Pat. Nos. 4,597,970 and 4,722,845, which disclosures are incorporated herein by reference.

The amount of flavoring agent employed herein is normally a matter of preference subject to such factors as the type of final chewing gum composition, the individual flavor, the gum base employed, and the strength of flavor desired. Thus, the amount of flavoring may be varied in order to obtain the result desired in the final product and such variations are within the capabilities of those skilled in the art without the need for undue experimentation. In gum compositions, the flavoring agent is generally present in amounts from about 0.02% to about 5%, and preferably from about 0.1% to about 2%, and more preferably, from about 0.8% to about 1.8%, by weight of the chewing gum composition.

The coloring agents useful in the present invention are used in amounts effective to produce the desired color. These coloring agents include pigments which may be incorporated in amounts up to about 6%, by weight of the gum composition. A preferred pigment, titanium dioxide, may be incorporated in amounts up to about 2%, and preferably less than about 1%, by weight of the gum composition. The colorants may also include natural food colors and dyes suitable for food, drug and cosmetic applications. These colorants are known as F.D.& C. dyes and lakes. The materials acceptable for the foregoing uses are preferably water-soluble. Illustrative nonlimiting examples include the indigoid dye known as F.D.& C. Blue No. 2, which is the disodium salt of 5,5-indigotindisulfonic acid. Similarly, the dye known as F.D.& C. Green No. 1 comprises a triphenylmethane dye and is the monosodium salt of 4-[4-(N-ethyl-p-sulfoniumbenzylamino) diphenylmethylene]-[1-(N-ethyl-N-p-sulfoniumbenzyl)-delta-2,5-cyclohexadieneimine]. A full recitation of all F.D.& C. colorants and their corresponding chemical structures may be found in the Kirk-Othmer Encyclopedia of Chemical Technology, 3rd Edition, in volume 5 at pages 857–884, which text is incorporated herein by reference.

Suitable oils and fats usable in gum compositions include partially hydrogenated vegetable or animal fats, such as coconut oil, palm kernel oil, beef tallow, lard, and the like. These ingredients when used are generally present in amounts up to about 7%, and preferably up to about 3.5%, by weight of the gum composition.

In accordance with this invention, effective amounts of the sweetening agent delivery system of the present invention may be admixed into the chewing gum composition. As set out above, the sweetening agent delivery systems of the present invention comprise a high intensity sweetening agent, polyvinyl acetate, a plasticizing agent, a waxy material, and an emulsifier. The exact amount of sweetening agent delivery system employed is normally a matter of preference subject to such factors as the particular type of gum composition being prepared, the type of bulking agent employed, the type of flavor employed, and the intensity of sweetness desired. Thus, the amount of sweetening agent delivery system may be varied in order to obtain the result desired in the final product and such variations are within the capabilities of those skilled in the art without the need for undue experimentation. In general, the amount of sweetening agent delivery system normally present in a chewing gum composition will be from about 0.1% to about 15%, preferably from about 1% to about 10%, and more preferably from about 2% to about 6%, by weight of the chewing gum composition.

In a preferred embodiment, the invention is directed at a sweetened chewing gum composition having prolonged sweetness release which comprises a gum base, a bulking agent, a flavoring agent, and an effective amount of a sweetening agent delivery system, wherein the chewing gum composition is prepared by a method which comprises the steps of:

(A) providing the following ingredients in percentages by weight of the sweetening agent delivery system:
  (a) a solution of a high intensity sweetening agent, wherein the sweetening agent is present in an amount from about 0.01% to about 60%;
  (b) polyvinyl acetate present in an amount from about 40% to about 93% and having a molecular weight in the range from about 2,000 to about 100,000;
  (c) a plasticizing agent present in an amount from about 0.1% to about 20%;
  (d) a waxy material having a melting point from about 30° C. to about 120° C. present in an amount from about 0.5% to about 40%;
  (e) an emulsifying agent present in an amount from about 0.1% to about 20%;
(B) melting and blending the polyvinyl acetate with the plasticizing agent to form a uniform mixture;
(C) admixing the solution of high intensity sweetening agent with the melted mixture from step (B) and evaporating the solvent to form a uniform mixture;
(D) admixing the waxy material and the emulsifying agent with the mixture from step (C) to form a uniform mixture;
(E) cooling and blending the mixture from step (D);
(F) granulating the mixture from step (E); and
(G) admixing the granulated mixture from step (F) with the gum base, bulking agent, and flavoring agent.

The present invention also includes a method for preparing the improved chewing gum compositions, including both chewing gum and bubble gum formulations. The chewing gum compositions may be prepared using standard techniques and equipment known to those skilled in the art. The apparatus useful in accordance with the present invention comprises mixing and heating apparatus well known in the chewing gum manufacturing arts, and therefore the selection of the specific apparatus will be apparent to the artisan.

In such a method, a chewing gum composition is made by admixing the gum base with the sweetening agent delivery system and the other ingredients of the final desired chewing gum composition. Other ingredients will usually be incorporated into the composition as dictated by the nature of the desired composition as well known by those having ordinary skill in the art. The ultimate chewing gum compositions are readily prepared using methods generally known in the food technology and chewing gum arts.

For example, the gum base is heated to a temperature sufficiently high to soften the base without adversely effecting the physical and chemical make up of the base. The optimal temperatures utilized may vary depending upon the composition of the gum base used, but such temperatures are readily determined by those skilled in the art without undue experimentation.

The gum base is conventionally melted at temperatures that range from about 60° C. to about 120° C. for a period of time sufficient to render the base molten. For example, the gum base may be heated under these conditions for a period of about thirty minutes just prior to being admixed incrementally with the remaining ingredients of the gum composition such as the inventive sweetening agent composition, plasticizer, the softener, the bulking agent, and/or fillers, coloring agents and flavoring agents to plasticize the blend as well as to modulate the hardness, viscoelasticity and formability of the base. Mixing is continued until a uniform mixture of gum composition is obtained. Thereafter the gum composition mixture may be formed into desirable chewing gum shapes.

In a preferred embodiment, the invention is directed at a method for preparing a sweetened chewing gum composition which comprises the steps of:
(1) providing the following ingredients:
  (A) a gum base;
  (B) a bulking agent;
  (C) an effective amount of the sweetening agent delivery system of the present invention having prolonged sweetness release which comprises in percentages by weight of the delivery system:
    (a) a high intensity sweetening agent present in an amount from about 0.01% to about 60%;
    (b) polyvinyl acetate present in an amount from about 40% to about 93% and having a molecular weight in the range from about 2,000 to about 100,000;
    (c) a plasticizing agent present in an amount from about 0.1% to about 20%;
    (d) a waxy material having a melting point from about 30° C. to about 120° C. present in an amount from about 0.5% to about 40%;
    (e) an emulsifying agent present in an amount from about 0.1% to about 20%; and
  (D) a flavoring agent;
(2) melting the gum base;
(3) admixing the bulking agent, sweetening agent delivery system, and the flavoring agent with the melted gum base; and
(4) forming the mixture from step (3) into suitable gum shapes.

The sweetening agent delivery system is prepared according to the method of the present invention.

Another important aspect of the present invention includes a sweetened confectionery composition incorporating the inventive sweetening agent delivery system and a method for preparing the sweetened confectionery compositions. The preparation of confectionery formulations is historically well known and has changed little through the years. Confectionery items have been classified as either "hard" confectionery or "soft" confectionery. The sweetening agent delivery systems of the present invention can be incorporated into the confections by admixing the inventive composition into the conventional hard and soft confections.

Hard confectionery may be processed and formulated by conventional means. In general, a hard confectionery has a base composed of a mixture of sugar and other carbohydrate bulking agents kept in an amorphous or glassy condition. This form is considered a solid syrup of sugars generally having from about 0.5% to about 1.5% moisture. Such materials normally contain up to about 92% corn syrup, up to about 55% sugar and from about 0.1% to about 5% water, by weight of the final composition. The syrup component is generally prepared from corn syrups high in fructose, but may include other materials. Further ingredients such as flavorings, sweetening agents, acidulants, colorants and so forth may also be added.

Such confectionery may be routinely prepared by conventional methods such as those involving fire cookers, vacuum cookers, and scraped-surface cookers also referred to as high speed atmospheric cookers.

Fire cookers involve the traditional method of making a candy base. In this method, the desired quantity of carbohydrate bulking agent is dissolved in water by heating the agent in a kettle until the bulking agent dissolves. Additional bulking agent may then be added and cooking continued until a final temperature of 145° C. to 156° C. is achieved. The batch is then cooled and worked as a plastic-like mass to incorporate additives such as flavoring agent, colorants and the like.

A high-speed atmospheric cooker uses a heat-exchanger surface which involves spreading a film of candy on a heat exchange surface, the candy is heated to 165° C. to 170° C. in a few minutes. The candy is then rapidly cooled to 100° C. to 120° C. and worked as a plastic-like mass enabling incorporation of the additives, such as flavoring agent, colorants and the like.

In vacuum cookers, the carbohydrate bulking agent is boiled to 125° C. to 132° C., vacuum is applied and additional water is boiled off without extra heating. When cooking is complete, the mass is a semi-solid and has a plastic-like consistency. At this point, flavoring agent, colorants, and other additives are admixed in the mass by routine mechanical mixing operations.

The optimum mixing required to uniformly mix the flavoring agent, colorants and other additives during conventional manufacturing of hard confectionery is determined by the time needed to obtain a uniform distribution of the materials. Normally, mixing times of from 4 to 10 minutes have been found to be acceptable.

Once the candy mass has been properly tempered, it may be cut into workable portions or formed into desired shapes. A variety of forming techniques may be utilized depending upon the shape and size of the final product desired. A general discussion of the composition and preparation of hard confections may be found in H. A. Lieberman, *Pharmaceutical Dosage Forms: Tablets, Volume* 1 (1980), Marcel Dekker, Inc., New York, N.Y. at pages 339 to 469, which disclosure is incorporated herein by reference.

The apparatus useful in accordance with the present invention comprises cooking and mixing apparatus well known in the confectionery manufacturing arts, and therefore the selection of the specific apparatus will be apparent to the artisan.

In contrast, compressed tablet confections contain particular materials and are formed into structures under pressure. These confections generally contain sugars in amounts up to about 95%, by weight of the composition, and typical tablet excipients such as binders and lubricants as well as flavoring agent, colorants and so forth.

Similar to hard confectionery, soft confectionery may be utilized in this invention. The preparation of soft confections, such as nougat, involves conventional methods, such as the combination of two primary components, namely (1) a high boiling syrup such as a corn syrup, or the like, and (2) a relatively light textured frappe, generally prepared from egg albumin, gelatin, vegetable proteins, such as soy derived compounds, sugarless milk derived compounds such as milk proteins, and mixtures thereof. The frappe is generally relatively light, and may, for example, range in density from about 0.5 to about 0.7 grams/cc.

The high boiling syrup, or "bob syrup" of the soft confectionery is relatively viscous and has a higher density than the frappe component, and frequently contains a substantial amount of carbohydrate bulking agent. Conventionally, the final nougat composition is prepared by the addition of the "bob syrup" to the frappe under agitation, to form the basic nougat mixture. Further ingredients such as flavoring, additional carbohydrate bulking agent, colorants, preservatives, medicaments, mixtures thereof and the like may be added thereafter also under agitation. A general discussion of the composition and preparation of nougat confections may be found in B. W. Minifie, Chocolate, Cocoa and Confectionery: Science and Technology, 2nd edition, AVI Publishing Co., Inc., Westport, Conn. (1980), at pages 424–425, which disclosure is incorporated herein by reference.

The procedure for preparing the soft confectionery involves known procedures. In general, the frappe component is prepared first and thereafter the syrup component is slowly added under agitation at a temperature of at least about 65° C., and preferably at least about 100° C. The mixture of components is continued to be mixed to form a uniform mixture, after which the mixture is cooled to a temperature below 80° C., at which point, the flavor may be added. The mixture is further mixed for an additional period until it is ready to be removed and formed into suitable confectionery shapes.

In accordance with this invention, effective amounts of the sweetening agent delivery systems of the present invention may be admixed into the hard and soft confections. As set out above, the sweetening agent delivery systems of the present invention comprise a high intensity sweetening agent, polyvinyl acetate, a plasticizing agent, a waxy material, and an emulsifier. The exact amount of sweetening agent delivery system employed is normally a matter of preference subject to such factors as the particular type of confection being prepared, the type of bulking agent or carrier employed, the type of flavor employed and the intensity of sweetness desired. Thus, the amount of sweetening agent delivery system may be varied in order to obtain the result desired in the final product and such variations are within the capabilities of those skilled in the art without the need for undue experimentation. In general, the amount of sweetening agent delivery system normally present in a hard or soft confection will be from about 0.01% to about 15%, preferably from about 0.1% to about 10%, and more preferably from about 1% to about 5%, by weight of the confection.

The present invention extends to methods for making the improved sweetened confections. The sweetening agent delivery systems may be incorporated into an otherwise conventional hard or soft confection composition using standard techniques and equipment known to those skilled in the art. The apparatus useful in accordance with the present invention comprises mixing and heating apparatus well known in the confectionery manufacturing arts, and therefore the selection of the specific apparatus will be apparent to the artisan.

In such a method, a composition is made by admixing the inventive sweetening agent delivery system into the confectionery composition along with the other ingredients of the final desired composition. Other ingredients will usually be incorporated into the composition as dictated by the nature of the desired composition as well known by those having ordinary skill in the art. The ultimate confectionery compositions are readily prepared using methods generally known in the food technology and pharmaceutical arts. Thereafter the confectionery mixture may be formed into desirable confectionery shapes.

The sweetening agent delivery systems may be formulated with conventional ingredients which offer a variety of textures to suit particular applications. Such ingredients may be in the form of hard and soft confections, tablets, toffee, nougat, chewy candy, chewing gum and so forth, both sugar and sugarless. The acceptable ingredients may be selected from a wide range of materials. Without being limited thereto, such materials include diluents, binders and adhesives, lubricants, disintegrants, bulking agents, humectants and buffers and adsorbents. The preparation of such confections and chewing gum products is well known.

Throughout this application, various publications have been referenced. The disclosures in these publications are incorporated herein by reference in order to more fully describe the state of the art.

The present invention is further illustrated by the following examples which are not intended to limit the effective scope of the claims. All parts and percentages in the examples and throughout the specification and claims are by weight of the final composition unless otherwise specified.

EXAMPLES 1-2

These examples demonstrate the preparation of a microencapsulated sweetening agent delivery system prepared according to the method of the present invention having prolonged sweetness release in chewing gum compositions.

A microencapsulated sweetening agent delivery system (Example 2) according to the present invention was prepared in the following manner. Polyvinyl acetate was heated by steam in a mixer to a temperature from about 100° C. to about 110° C. for approximately 20 to 30 minutes until melted and uniform. Acetylated monoglyceride was then blended into the melted polyvinyl acetate at a temperature from about 95° C. to about 100° C. and mixed for approximately 10 minutes until uniform. An aqueous solution of 25% Sucralose was slowly admixed with the melted polyvinyl acetate and plasticizer mixture at a temperature of approximately 95° C. to 100° C. and at an addition rate sufficiently slow to evaporate the solvent. After the solvent was evaporated, the resultant mixture was cooled to approximately 80° C. to 85° C. with mixing for about 10 minutes. A mixture of hydrogenated soybean oil and glycerol monostearate was then blended into the intense sweetener-polyvinyl acetate mixture at a temperature of approximately 80° C. to 85° C. for approximately 15 minutes until uniform. The mixture was then cooled and the hardened mixture was granulated to a final mesh size of about 30 to about 200 U.S standard mesh (600 to 75 microns).

A control sample (Example 1) of microencapsulated sweetening agent delivery system was prepared by substituting an equivalent quantity of solid spray dried Sucralose (50%) for the aqueous solution of 25% Sucralose set out above. The encapsulated sweetening agent delivery systems of Examples 1 and 2 had the formulas set out in Table 1.

TABLE 1

| SWEETENING AGENT DELIVERY SYSTEMS | | |
|---|---|---|
| Ingredient | Example 1 (Control) | Example 2 (Inventive) |
| Polyvinyl acetate | 75% | 82% |
| Waxy material | 5% | 5% |
| Emulsifying agent | 5% | 5% |

TABLE 1-continued

| SWEETENING AGENT DELIVERY SYSTEMS | | |
|---|---|---|
| Ingredient | Example 1 (Control) | Example 2 (Inventive) |
| Plasticizing agent | 5% | 3% |
| Spray dried Sucralose (50%) | 10% (5% Sucralose) | — |
| Aqueous Sucralose Solution (25%) | — | 5% (dry weight) |

The encapsulated sweetening agent delivery systems of Examples 1 and 2 were then incorporated into the chewing gum compositions set out in Table 2 according to conventional chewing gum manufacturing techniques.

TABLE 2

| CHEWING GUM COMPOSITIONS | | |
|---|---|---|
| Ingredient | Example 1 (Control) | Example 2 (Inventive) |
| Gum Base | 26.000% | 26.000% |
| Bulking agent | 58.448% | 58.448% |
| Softening agent | 9.500% | 9.500% |
| Coloring agent | 0.172% | 0.172% |
| Flavoring agent | 1.880% | 1.880% |
| Control Sucralose Delivery System | 4.000% | — |
| Inventive Sucralose Delivery System | — | 4.000% |

An expert taste panel evaluated the relative sweetening intensity at different chew out times of the chewing gums of Examples 1-2 (on a scale of 0-100, 0 being not sweet, and 100 being very sweet) in random order and the findings were pooled and averaged. The results from the taste panel are set out in graphic format in FIG. 1.

FIG. 1 shows that the sweetness intensity contribution over time of the improved encapsulated sweetening agent delivery system of Example 2, which was prepared using a solution of high intensity sweetening agent, is similar up to about 6 minutes but is more prolonged after 6 minutes, than the sweetness intensity of the control encapsulated sweetening agent delivery system of Example 1, which was prepared using a solid high intensity sweetening agent. Hence, the sweetening agent delivery system of Example 2 possessed improved sweetness duration.

The invention being thus described, it will be obvious that the same may be varied in many ways. Such variations are not to be regarded as a departure from the spirit and scope of the invention and all such modifications are intended to be included within the scope of the following claims.

We claim:

1. A sweetening agent delivery system having prolonged sweetness release prepared by a method which comprises the steps of:
   (A) providing the following ingredients in percentages by weight of the sweetening agent delivery system:
      (a) a solution of a high intensity sweetening agent, wherein the sweetening agent is present in an amount from about 0.01% to about 60%;
      (b) polyvinyl acetate present in an amount from about 40% to about 93% and having a molecular weight in the range from about 2,000 to about 100,000;

(c) a plasticizing agent present in an amount from about 0.1% to about 20%;
(d) a waxy material having a melting point from about 30° C. to about 120° C. present in an amount from about 0.5% to about 40%;
(e) an emulsifying agent present in an amount from about 0.1% to about 20%;

(B) melting and blending the polyvinyl acetate with the plasticizing agent to form a uniform mixture;

(C) admixing the solution of high intensity sweetening agent with the melted mixture from step (B) and evaporating the solvent to form a uniform mixture;

(D) admixing the waxy material and the emulsifying agent with the mixture from step (C) to form a uniform mixture;

(E) cooling and blending the mixture from step (D); and (F) granulating the mixture from step (E).

2. The sweetening agent delivery system according to claim 1, wherein the high intensity sweetening agent is selected from the group consisting of saccharin and its salts, cyclamate and its salts, Acesulfame-K, Aspartame, Alitame, Sucralose, and mixtures thereof.

3. The sweetening agent delivery system according to claim 1, wherein the solution of a high intensity sweetening agent is a solution in water.

4. The sweetening agent delivery system according to claim 3, wherein the solution of a high intensity sweetening agent is a 25% aqueous solution of Sucralose.

5. The sweetening agent delivery system according to claim 1, wherein the polyvinyl acetate has a molecular weight in the range from about 10,000 to about 60,000.

6. The sweetening agent delivery system according to claim 1, wherein the plasticizing agent is selected from the group consisting of acetylated monoglyceride, esters of phthalic acid, adipic acid, sebacic acid, polyols such as ethylene glycol and its derivatives, tricresyl phosphate, castor oil, dibutyl sebacate, triethyl citrate, tributyl citrate, triacetin, acetylated mono-, di- and triglycerides, acetyltriethylcitrate, triethylcitrate, acetyltributylcitrate, tributylcitrate, and mixtures thereof.

7. The sweetening agent delivery system according to claim 1, wherein the waxy material is selected from the group consisting of hydrogenated soybean oil, hydrogenated palm oil, hydrogenated castor oil, hydrogenated cottonseed oil, stearic acid, palmitic acid, and mixtures thereof.

8. The sweetening agent delivery system according to claim 1, wherein the emulsifying agent is selected from the group consisting of acetylated monoglycerides, glyceryl monostearate, stearic acid, and the like, and mixtures thereof.

9. A method for preparing a sweetening agent delivery system having prolonged sweetness release which comprises the steps of:
(A) providing the following ingredients in percentages by weight of the sweetening agent delivery system:
(a) a solution of a high intensity sweetening agent, wherein the sweetening agent is present in an amount from about 0 01% to about 60%;
(b) polyvinyl acetate present in an amount from about 40% to about 93% and having a molecular weight in the range from about 2,000 to about 100,000;
(c) a plasticizing agent present in an amount from about 0.1% to about 20%;
(d) a waxy material having a melting point from about 30° C. to about 120° C. present in an amount from about 0.5% to about 40%;
(e) an emulsifying agent present in an amount from about 0.1% to about 20%;

(B) melting and blending the polyvinyl acetate with the plasticizing agent to form a uniform mixture;

(C) admixing the solution of high intensity sweetening agent with the melted mixture from step (B) and evaporating the solvent to form a uniform mixture;

(D) admixing the waxy material and the emulsifying agent with the mixture from step (C) to form a uniform mixture;

(E) cooling and blending the mixture from step (D); and (F) granulating the mixture from step (E).

10. The method according to claim 9, wherein the high intensity sweetening agent is selected from the group consisting of saccharin and its salts, cyclamate and its salts, Acesulfame-K, Aspartame, Alitame, Sucralose, and mixtures thereof.

11. The method according to claim 9, wherein the solution of a high intensity sweetening agent is a solution in water.

12. The method according to claim 11, wherein the solution of a high intensity sweetening agent is a 25% aqueous solution of Sucralose.

13. The method according to claim 9, wherein the polyvinyl acetate has a molecular weight in the range from about 10,000 to about 60,000.

14. The method according to claim 9, wherein the plasticizing agent is selected from the group consisting of acetylated monoglyceride, esters of phthalic acid, adipic acid, sebacic acid, polyols such as ethylene glycol and its derivatives, tricresyl phosphate, castor oil, dibutyl sebacate, triethyl citrate, tributyl citrate, triacetin, acetylated mono-, di- and triglycerides, acetyl-triethylcitrate, triethylcitrate, acetyltributylcitrate, tributylcitrate, and mixtures thereof.

15. The method according to claim 9, wherein the waxy material is selected from the group consisting of hydrogenated soybean oil, hydrogenated palm oil, hydrogenated castor oil, hydrogenated cottonseed oil, stearic acid, palmitic acid, and mixtures thereof.

16. The method according to claim 9, wherein the emulsifying agent is selected from the group consisting of acetylated monoglycerides, glyceryl monostearate, stearic acid, and the like, and mixtures thereof.

17. An edible composition having prolonged sweetness release which comprises a pharmaceutically acceptable carrier and an effective amount of a sweetening agent delivery system, wherein the edible composition is prepared by a method which comprises the steps of:
(A) providing the following ingredients in percentages by weight of the sweetening agent delivery system:
(a) a solution of a high intensity sweetening agent, wherein the sweetening agent is present in an amount from about 0.01% to about 60%;
(b) polyvinyl acetate present in an amount from about 40% to about 93% and having a molecular weight in the range from about 2,000 to about 100,000;
(c) a plasticizing agent present in an amount from about 0.1% to about 20%;

(d) a waxy material having a melting point from about 30° C. to about 120° C. present in an amount from about 0.5% to about 40%;
(e) an emulsifying agent present in an amount from about 0.1% to about 20%;
(B) melting and blending the polyvinyl acetate with the plasticizing agent to form a uniform mixture;
(C) admixing the solution of high intensity sweetening agent with the melted mixture from step (B) and evaporating the solvent to form a uniform mixture;
(D) admixing the waxy material and the emulsifying agent with the mixture from step (C) to form a uniform mixture;
(E) cooling and blending the mixture from step (D);
(F) granulating the mixture from step (E); and
(G) admixing the granulated mixture from step (F) with the pharmaceutically acceptable carrier.

18. A sweetened chewing gum composition having prolonged sweetness release which comprises a gum base, a bulking agent, a flavoring agent, and an effective amount of a sweetening agent delivery system, wherein the chewing gum composition is prepared by a method which comprises the steps of:
(A) providing the following ingredients in percentages by weight of the sweetening agent delivery system:
  (a) a solution of a high intensity sweetening agent, wherein the sweetening agent is present in an amount from about 0.01% to about 60%;
  (b) polyvinyl acetate present in an amount from about 40% to about 93% and having a molecular weight in the range from about 2,000 to about 100,000;
  (c) a plasticizing agent present in an amount from about 0.1% to about 20%;
  (d) a waxy material having a melting point from about 30° C. to about 120° C. present in an amount from about 0.5% to about 40%;
  (e) an emulsifying agent present in an amount from about 0.1% to about 20%;
(B) melting and blending the polyvinyl acetate with the plasticizing agent to form a uniform mixture;
(C) admixing the solution of high intensity sweetening agent with the melted mixture from step (B) and evaporating the solvent to form a uniform mixture;
(D) admixing the waxy material and the emulsifying agent with the mixture from step (C) to form a uniform mixture;
(E) cooling and blending the mixture from step (D);
(F) granulating the mixture from step (E); and
(G) admixing the granulated mixture from step (F) with the gum base, bulking agent, and flavoring agent.

19. A sweetened confectionery composition having prolonged sweetness release which comprises a confectionery bulking agent and an effective amount of a sweetening agent delivery system, wherein the confectionery composition is prepared by a method which comprises the steps of:
(A) providing the following ingredients in percentages by weight of the sweetening agent delivery system:
  (a) a solution of a high intensity sweetening agent, wherein the sweetening agent is present in an amount from about 0.01% to about 60%;
  (b) polyvinyl acetate present in an amount from about 40% to about 93% and having a molecular weight in the range from about 2,000 to about 100,000;
  (c) a plasticizing agent present in an amount from about 0.1% to about 20%;
  (d) a waxy material having a melting point from about 30° C. to about 120° C. present in an amount from about 0.5% to about 40%;
  (e) an emulsifying agent present in an amount from about 0.1% to about 20%;
(B) melting and blending the polyvinyl acetate with the plasticizing agent to form a uniform mixture;
(C) admixing the solution of high intensity sweetening agent with the melted mixture from step (B) and evaporating the solvent to form a uniform mixture;
(D) admixing the waxy material and the emulsifying agent with the mixture from step (C) to form a uniform mixture;
(E) cooling and blending the mixture from step (D);
(F) granulating the mixture from step (E); and
(G) admixing the granulated mixture from step (F) with the confectionery bulking agent.

20. A method for sweetening an edible composition which comprises adding to the edible composition an effective amount of a sweetening agent delivery system, wherein the sweetening agent delivery system is prepared by a method which comprises the steps of:
(A) providing the following ingredients in percentages by weight of the sweetening agent delivery system:
  (a) a solution of a high intensity sweetening agent, wherein the sweetening agent is present in an amount from about 0.01% to about 60%;
  (b) polyvinyl acetate present in an amount from about 40% to about 93% and having a molecular weight in the range from about 2,000 to about 100,000;
  (c) a plasticizing agent present in an amount from about 0.1% to about 20%;
  (d) a waxy material having a melting point from about 30° C. to about 120° C. present in an amount from about 0.5% to about 40%;
  (e) an emulsifying agent present in an amount from about 0.1% to about 20%;
(B) melting and blending the polyvinyl acetate with the plasticizing agent to form a uniform mixture;
(C) admixing the solution of high intensity sweetening agent with the melted mixture from step (B) and evaporating the solvent to form a uniform mixture;
(D) admixing the waxy material and the emulsifying agent with the mixture from step (C) to form a uniform mixture;
(E) cooling and blending the mixture from step (D); and
(F) granulating the mixture from step (E).

* * * * *